INVENTOR.
WILLIAM P. CANEPA
BY Darby & Darby
ATTORNEYS

Nov. 12, 1968 W. P. CANEPA 3,410,745
APPARATUS FOR ADAPTING SLIDE FASTENERS
TO BE HEAT SEALED IN PLACE
Original Filed March 19, 1965 5 Sheets-Sheet 4

INVENTOR
WILLIAM P. CANEPA
BY Darby & Darby
ATTORNEYS

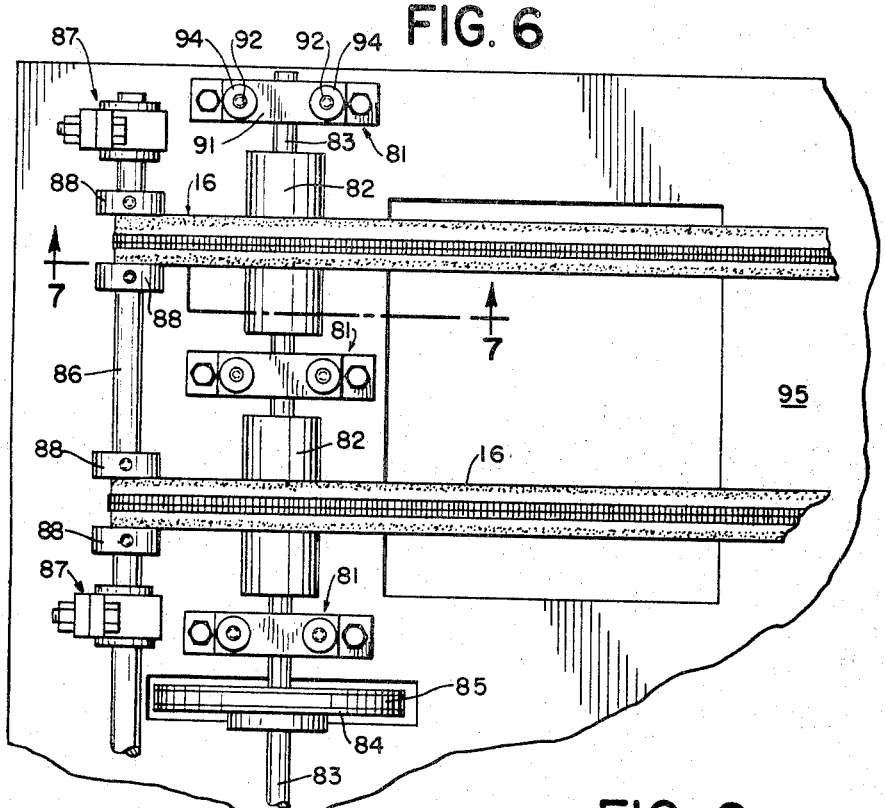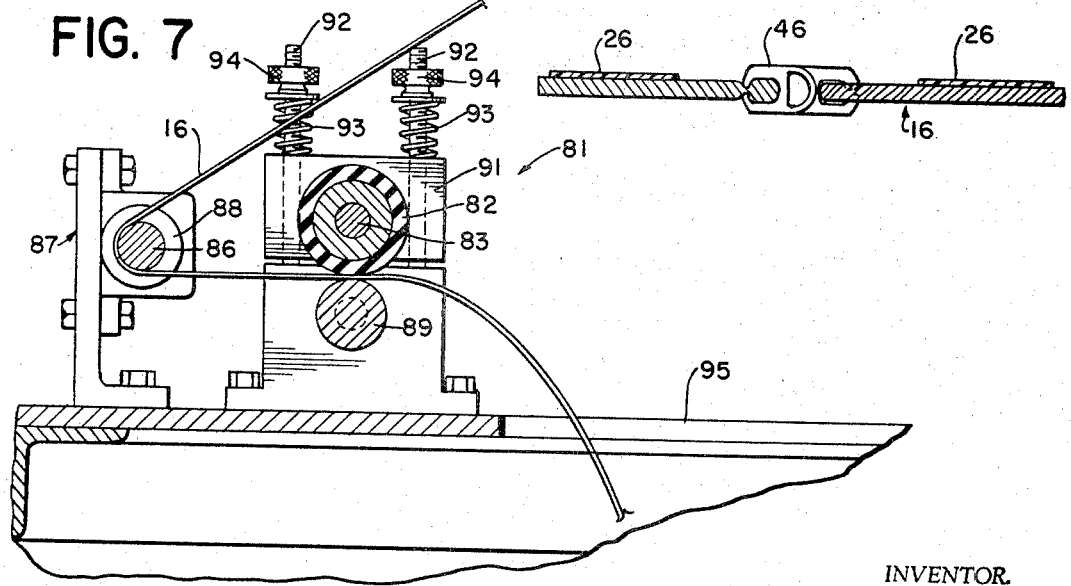

3,410,745
APPARATUS FOR ADAPTING SLIDE FASTENERS
TO BE HEAT SEALED IN PLACE
William P. Canepa, 236 W. 27th St.,
New York, N.Y. 10001
Continuation of application Ser. No. 441,142, Mar. 19,
1965. This application Dec. 15, 1967, Ser. No. 691,065
9 Claims. (Cl. 156—554)

This application is a continuation of Ser. No. 441,142 filed Mar. 19, 1965, now abandoned.

The present invention relates to apparatus for applying a heat sealing material on slide fastener (zipper) stringers whereby the stringer (and the slide fastener) may be secured in a garment or other article by a heat sealing process rather than being sewn in place.

The present invention is a further development of the concepts described in Harry Klein U.S. Patent No. 2,768,922 issued Oct. 30, 1956 and assigned to William P. Canepa.

As described in the aforementioned patent, numerous advantages reside in adapting slide fasteners to be secured by means of a heat sealing process rather than by the conventional sewing process. The present invention provides apparatus which is particularly simple and efficient and makes possible the rapid and inexpensive adaptation of slide fasteners for installation by a heat sealing process.

It is an object of the present invention to provide apparatus for adapting slide fasteners for installation by a heat sealing process wherein the necessary conditions of heat and pressure are accurately controlled and the adaptation of slide fastener strips is carried out with speed and efficiency.

It is a further object of the present invention to provide such apparatus which is easily operated and controlled.

Further objects and advantages will be apparent from a consideration of the following description in conjunction with the appended drawings in which:

FIG. 6 is a plan view of a portion of the apparatus shown in FIG. 1;

FIG. 7 is a sectional view of the apparatus in FIG. 6 taken along the line 7—7 in FIG. 6; and FIG. 8 is a sectional view of a zipper tape in an intermediate stage prior to emerging from the apparatus of FIGURES 1 through 7.

Figure 1:
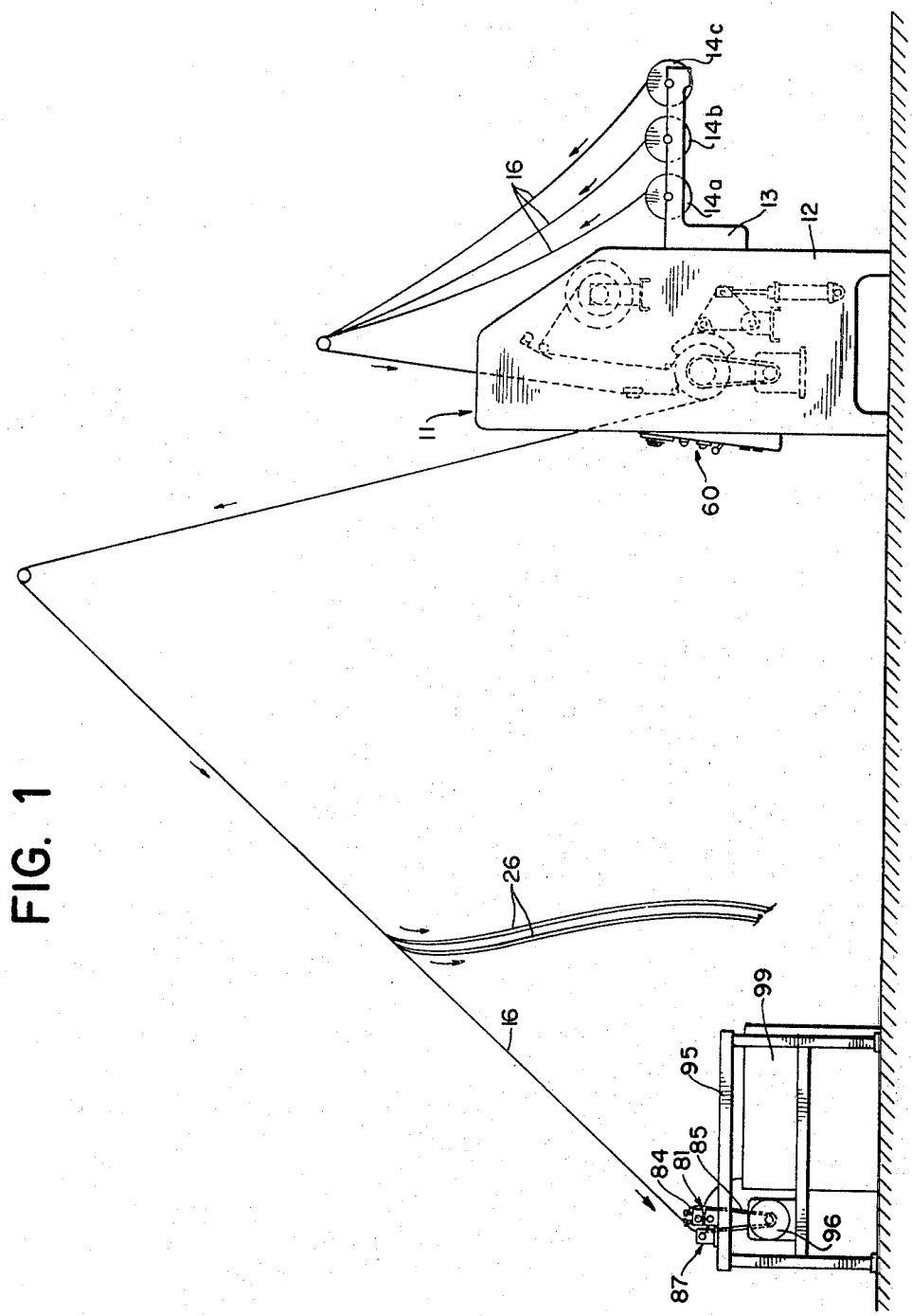
FIG. 1 is a side elevation showing apparatus according to the present invention.
Figure 2:
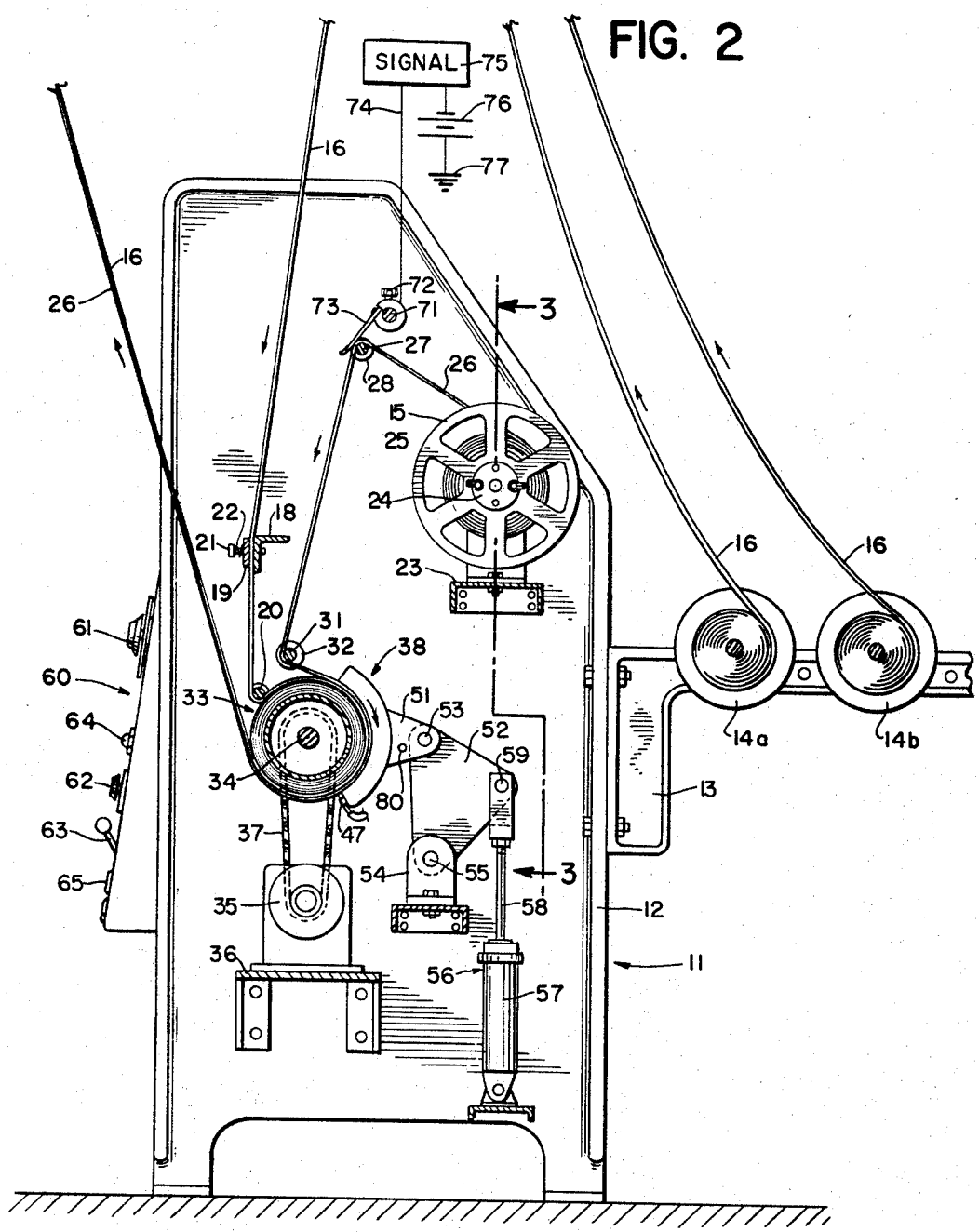
FIG. 2 is an enlarged vertical sectional view, partially schematic, of a portion of the apparatus of FIG. 1.

Referring now to the drawings and particularly to FIGURES 1 and 2, processing apparatus 11 is shown comprising a frame or housing 12 having attached thereto a spool holder 13 adapted to support and notably retain a plurality of spools 14a through 14c and others not visible in FIGS. 1 and 2. The spools contain lengths of slide fastener which includes two fabric tape stringers secured together by means of their respective associated slide fastener elements or scoops. Obviously the lengths of slide fastener 16 are to be later cut to length and provided with couplings, slides, etc.

The apparatus illustrated is adapted to simultaneously process six strips of slide fastener, but it will be understood that the apparatus may be arranged to process a greater or lesser number of slide fastener strips.

The slide fastener strip 16 feeds through a tension control device comprising a platen 18 secured to frame 12, a pressure plate 19, pressure plate springs 22 and pressure adjustment screws 21.

The slide fastener strips feed from the tension control element over a support rod 20 into frictional contact with a padded roller 33. The roller 33 is rotatably supported on a shaft 34 and is arranged to be driven by a motor 35 which is secured to frame 12 by means of a mounting bracket 36. The motor 35 incorporates a gear box, preferably of the variable speed type and is connected to drive the roller 33 by any suitable means such as the chain drive 37 illustrated in FIG. 2.

Figure 4:
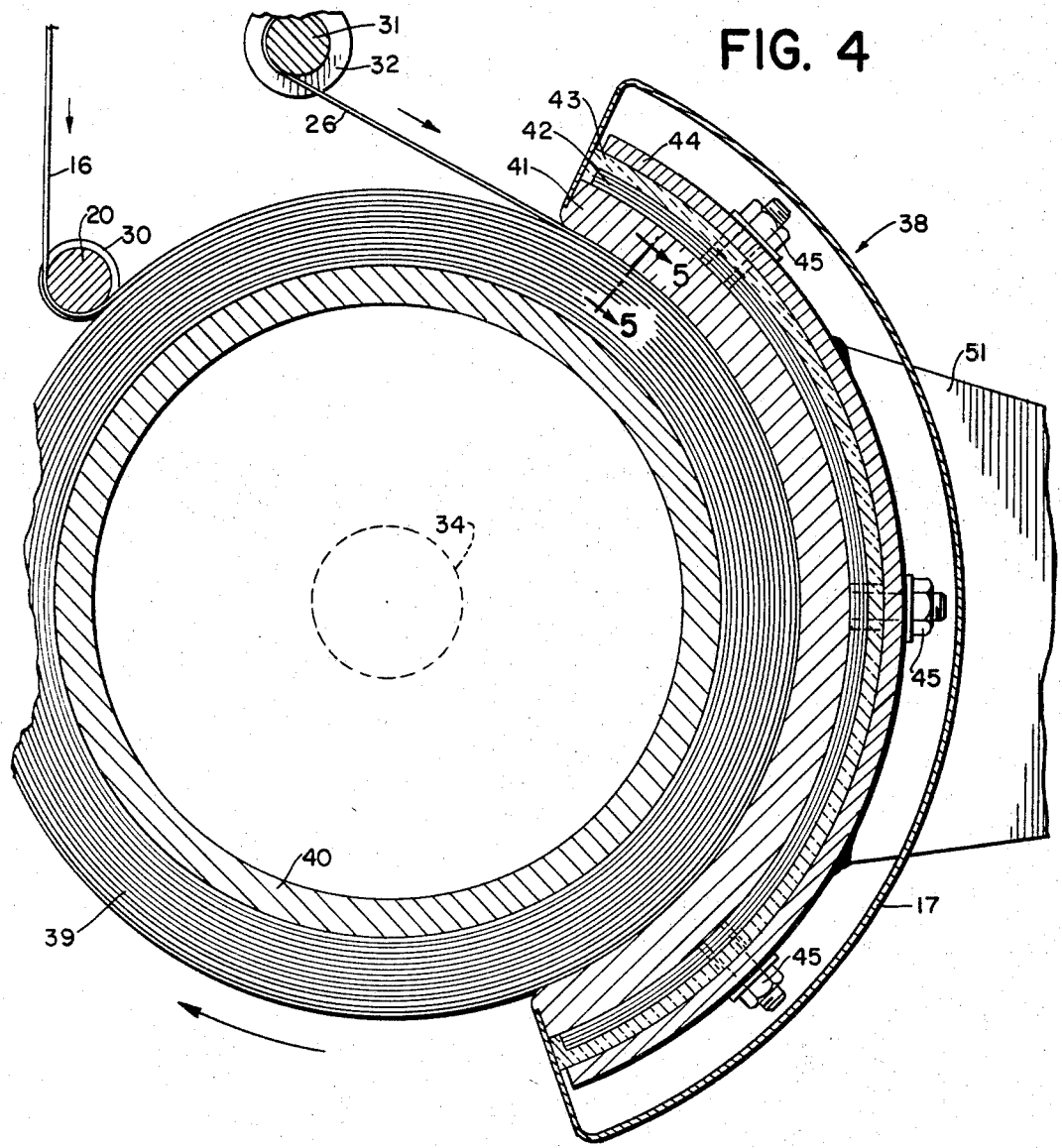
FIG. 4 is an enlarged sectional view of a portion of the apparatus of FIG. 2.

An arcuate heating and pressure element 38 cooperates with the padded roller 33. It will be noted in FIG. 4 that the padded roller 33 comprises a pad 39 of cotton fabric or the like over a metal drum or cylinder 40 and that the heating and pressure element 38 is shaped to conform to the outer surface of the padded roller 33.

The heating and pressure element 38 comprises a sole plate 41 which may be formed of metal such as stainless steel, aluminum or the like. On the rear of the sole plate 41 is an electrical heater element of conventional form which may include, for example, a sinuous winding of resistance wire provided with suitable temperature resistant insulation such as mica.

The heater is provided with heat insulation material 43 such as asbestos sheet and the various layers described are secured in place by means of metal retaining plate 44 secured by fasteners 45 illustrated as threaded studs extending from sole plate 41 together with nuts for securely retaining the elements of the heating and pressure element 38. A shield or housing 17 for the heating and pressure element may be provided.

The heating and pressure element 38 is arranged so that it may be pressed into engagement with the padded roll 33 or separated therefrom as may be required to initially thread the slide fastener strips and coating tapes through the apparatus.

Figure 3:
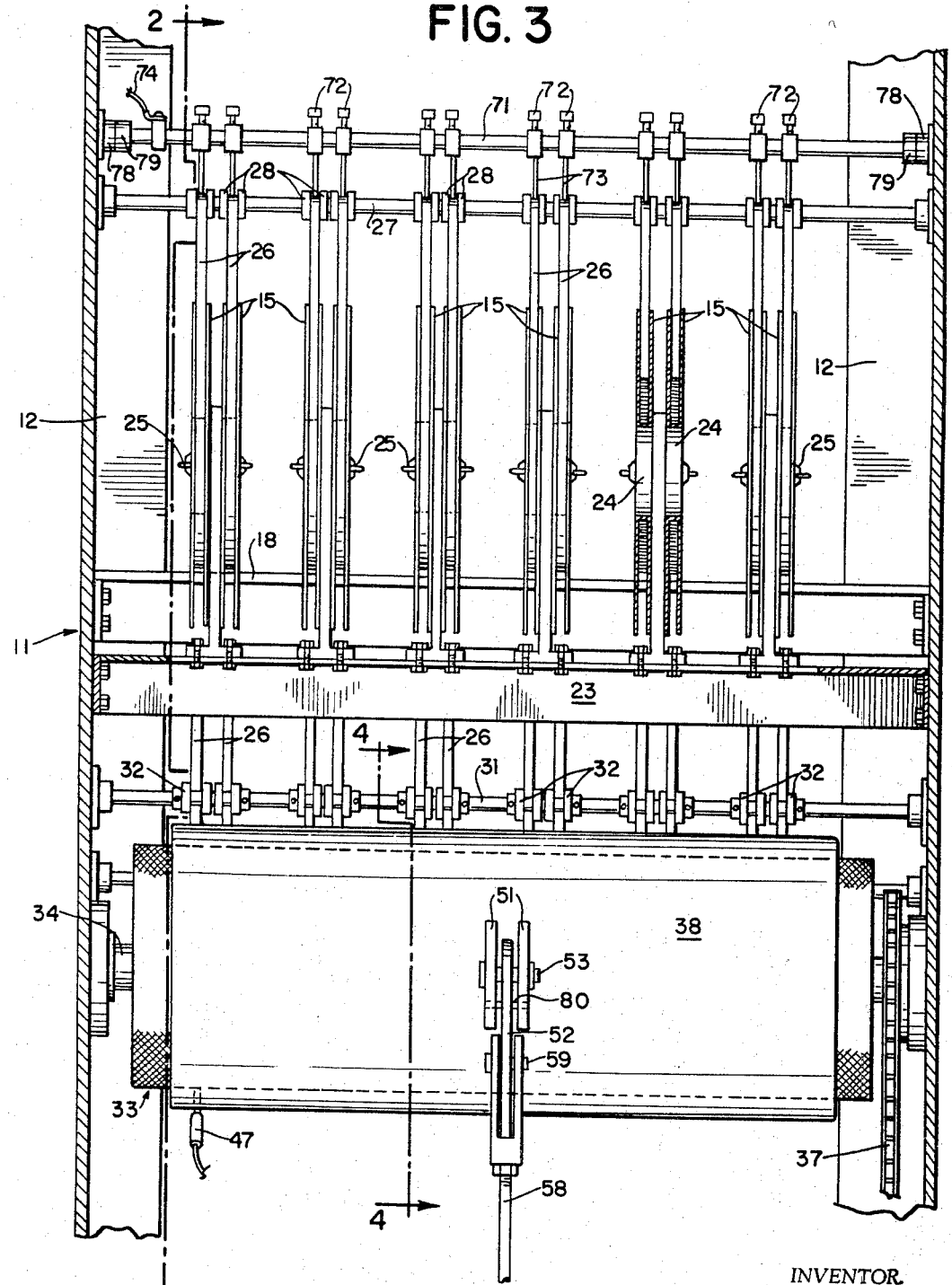
FIG. 3 is a sectional view of the apparatus according to the present invention taken along the line 3—3 in FIG. 2.

While the adjustment of the position of the heating and pressure element 38 may be manual, it is preferably remotely controlled as illustrated in FIG. 2 and FIG. 3. The heating and pressure element 38 is provided with pivot plates 51 extending rearwardly therefrom. A pin 53 extends through pivot plates 51 and also through actuator plate 52. Heating and pressure element 38 is thereby secured for limited rotational movement with respect to an actuator plate 52. The relative motion is limited by stop pin 80 thus assuring approximate alignment of heating and pressure element 38 as it approaches the padded roller 33.

Actuator plate 52 is supported for rotational movement with respect to frame 12 by means of a shaft 55 extending through bearing plates 54 and through actuator plate 52.

Force required for the engagement and disengagement of heating and pressure element 38 with padded roller 33 is provided by a suitable remotely controlled actuator illustrated as air cylinder 56 in FIG. 2. The air cylinder actuator 56 comprises a cylinder 57 and piston (not shown) which acts through a piston rod 58 and pivotal connection 59 to move the heating and pressure element 38 into and out of contact with the padded roller 33.

A heat sensing element 47 is secured in contact with or adjacent to the sole plate 41 so that the temperature of the sole plate may be accurately controlled either manually or automatically.

As the slide fastener strip 16 is fed into the apparatus and against the padded roller 33, it is supported and guided by guide rod 20 having ribs 30 serving to maintain the lateral position of each of the slide fastener strips 16.

For each of the slide fastener strips 16 there are provided two coating tape reels 15 rotatably mounted on support discs 24 secured by a bracket 23 to frame 12. The reels 15 may be secured in place by rotational latches 25. The reels 15 contain a substantial length of heat sealable coating tape which may, for example, comprise a paper tape or other carrier coated on one face with a fuseable plastic such as, for example, a thermoplastic vinyl resin, nylon resin, or polyethylene. The coating tape 26 is guided over rods 27 and 31 to be aligned with the stringers of one of the slide fastener strips 16. Alignment of the coating tape 26 is assured by collars 28 and 32 on guide rods 27 and 31 respectively.

Figure 5:
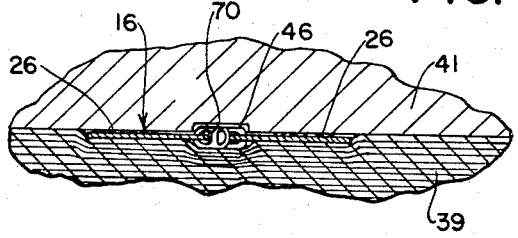
FIG. 5 is a sectional view taken along the line 5—5 in FIG. 4.

The relative position of the coating tapes 26 and the slide fastener strips 16 as they pass under the pressure and heating element 38 may best be seen by reference to FIG. 5. It will there be seen that the slide fastener strip comprises two stringer tapes joined by slide fastener elements 46 which interlock in the conventional manner. On either side of the slide fastener elements 46 is located a coating tape 26 with the fuseable plastic material of the coating tape in contact with the stringer tapes. It will also be noted in FIG. 5 that a groove 70 is provided in the sole plate 41 to accommodate the slide fastener elements 46 of each of the slide fastener strips 16.

As the fastener strips 16 are guided between the padded roller 33 and the heating and pressure element 38 together with their respective associated coating tapes 26, the proper heat (in a typical example from 250–350° F.) and pressure is supplied for sufficient time to fuse fuseable plastic material of the coating tape to cause it to penetrate into and strongly adhere to the fabric stringers of the slide fastener strip. Upon emerging from the heating and pressure element 38 the slide fastener strips and the coating tapes are united as illustrated in FIG. 8.

In the usual case it will then be desirable to strip away the paper base of the coating tapes 26 leaving only a coating of heat sealable plastic material on the stringers of the slide fastener strip.

It will be appreciated that care must be taken to assure that the supply of coating tape is not exhausted allowing a portion of the slide fastener strip to proceed through the apparatus without being coated with the heat sealing material. Accordingly, a signal or alarm is provided in the apparatus to automatically advise the operator if any of the coating tape reels become exhausted (or also if, for any reason, the tape should break and thus cease to feed through the apparatus).

The alarm system comprises a buss rod 71 mounted in electrically insulated relation to the frame 12 by means of bracket 78 and insulator 79. On the buss rod 71 there are mounted a plurality of contact supports 72 equal in number to the number of coating tapes. Each contact strip support 72 supports a spring contact 73 in a position such that it would normally be in contact with the guide rod 27 except for the intervention of the coating tapes 26.

The buss rod 71 is connected by an electrical lead 74 to a signal 75 consisting of a buzzer or a light or both. A source of electrical voltage such as a battery 76 is connected between the signal 75 and electrical ground 77 which may consist of the frame 12 of the apparatus 11 so that the circuit to the signal 75 is completed if any one of the spring contact 73 comes into contact with the guide rod 27 by virtue of interruption of a coating tape 26.

Alternatively, the voltage source 76 may be a low voltage transformer secondary having its primary connected in parallel with motor 35 so that de-energization of the motor 35 automatically cuts off the buzzer or other signal 75. A switch may also be provided to de-energize the signal 75.

The electrical controls and other controls for the motors and cylinder in the apparatus thus described have generally been omitted or indicated only schematically as they are generally of a form known and conventionally used in electromechanical apparatus. It may be noted, however, that a control panel 60 is provided having controls 61, 62 and 63 for heat, motor speed, and pressure actuator; and having indicators 64 and 65 for showing motor operation, temperature, or the like.

As previously mentioned, the normal processing operation with the apparatus of the present invention contemplates stripping the paper tape from the slide fastener stringers leaving only the coating of heat sealing material. It is generally desirable that the slide fastener strip be cooled prior to removing the paper of the coating tapes, otherwise the paper will not be removed cleanly from the slide fastener tape. While the tape may be cooled rapidly by passage over a cold roller or the like, it has been found to be convenient simply to allow a short run of slide fastener tape between the heat and pressure apparatus and the point of removal of the paper tape as illustrated in FIG. 1. The exposure of the tape to ambient temperature conditions for a few seconds thus provided is sufficient to cool the tape to the point where the paper of the coating tape can be cleanly removed without difficulty.

The paper tape can be removed by constant tension reeling apparatus (not shown) or may be removed by hand.

As shown in FIGURES 1, 6 and 7, takeup and storage apparatus is provided for the slide fastener strip.

On a support 95 there is mounted a motor 96 which is connected to drive a pulley 84 through a belt 85. Pulley 84 is secured to a shaft 83 which rotates therewith. The shaft 83 is supported in bearings 81 and has mounted thereon rollers 82 with a resilient surface of rubber or other material. Also rotatably supported in brackets 81 are free running rollers 89 which may be hard surfaced steel rollers, for example.

The slide fastener tape 16 is guided to respective pairs of rollers by guide bar 86 supported to brackets 87 and having guide collars 88.

Means may be provided for adjusting the pressure between rollers 82 and 89 such as the slidably mounted section 91 of bracket 81. Slideably mounted section 91 is supported by elongated studs 92 which are also support springs 93. Adjustment nuts 94 are provided on a threaded end portion of elongated studs 92 for adjusting the compression of springs 93 and hence the pressure between rollers 82 and 89.

The motor 96 is preferably geared to tend to drive the slide fastener strip between rollers 82 and 89 at a speed slightly in excess of the speed at which it is driven by padded roller 38. The pressure between rollers 82 and 89 is such that a small amount of slippage can take place, but a substantially uniform tension is maintained on the slide fastener tape 16.

The slide fastener strip is collected in a storage device 99 which may comprise automatic reeling apparatus (not shown). In other cases it is desirable to collect the slide-fastener strip loosely in bulk and reel it on to drums and inspect it in a subsequent operation.

From the foregoing description it will be appreciated that apparatus has been provided which is suited for processing slide fastener strip with a heat sealing coating along the stringers of the slide fastener strip in accordance with the basic principles of the process of U.S. Patent No. 2,768,922. The apparatus has features adapting it for rapid, efficient, and reliable operation. In addition to modifications and variations of the apparatus suggested in the foregoing description it will be apparent to those skilled in the art that numerous other variations and modifications may be made to the apparatus without exceeding the scope of the present invention. Accordingly, it is desired that the scope of the invention not be limited to those specific forms of the apparatus shown or suggested, but that it be defined by reference to the appended claims.

What is claimd is:

1. Slide fastener strip processing apparatus comprising a padded roller, means for feeding a substantial length of slide fastener strip, means for guiding said strip over said padded roller, pressure means associated with said roller for subjecting said slide fastener strip to pressure, said pressure means having an indentation adapted to accommodate the scoops of said slide fastener strip to avoid interference with the passage of said strip and a flat portion adjacent said indentation adapted to contact a substantial width of the stringer portion of said strip for the application of pressure thereto, heating means for heating said flat portion of said pressure means thus applying heat to said slide fastener strip simultaneously with the application of pressure thereto by said pressure means, means for controlling the temperature of said heating means, means for applying and removing the pressure of said pressure means, means for driving said padded roller at a controlled speed, supply and feed means for supplying and feeding coating tape to be juxtaposed with said slide fastener strip and simultaneously fed over said roller with the coating tape in contact with said heating and pressure means, means for guiding said slide fastener tape and said coating tape to cause said coating tape to be applied to said slide fastener tape along a predetermined area of the stringer portion of said slide fastener strip, means for withdrawing the slide fastener strip and coating tape from said padded roller and maintaining a substantially uniform tension thereon, and means for signaling the interruption of said coating tape.

2. Slide fastener strip processing apparatus comprising a padded roller, means for feeding a substantial length of slide fastener strip, means for guiding said strip over said padded roller, pressure means associated with said roller for subjecting said slide fastener strip to pressure, said presure mean having an indentation adapted to accommodate the scoops of said slide fastener strip to avoid interference with the passage of said strip and a flat portion adjacent said indentation adapted to contact a substantial width of the stringer portion of said strip for the application of pressure thereto, heating means for applying heat to said slide fastener strip simultaneously with the application of pressure thereto by said pressure means, means for controlling the temperature of said heating means, means for applying and removing the pressure of said pressure means, means for driving said padded roller at a controlled speed, supply and feed means for supplying and feeding coating tape to be juxtaposed with said slide fastener strip and simultaneously fed over said roller with the coating tape in contact with said pressure means, means for guiding said slide fastener tape and said coating tape to cause said coating tape to be applied to said slide fastener tape along a predetermined area of the stringer portion of said slide fastener strip, means for withdrawing the slide fastener strip and coating tape from said padded roller and maintaining a substantially uniform tension thereon, and means for signaling the interruption of said coating tape.

3. Slide fastener strip processing apparatus comprising a padded roller, means for feeding a substantial length of slide fastener strip, means for guiding said strip over said padded roller, pressure means associated with said roller for subjecting said slide fastener strip to pressure, said pressure means having an indentation adapted to accommodate the scoops of said slide fastener strip to avoid interference with the passage of said strip and a portion adjacent said indentation adapted to contact a substantial width of the stringer portion of said strip for the application of pressure thereto, heating means associated with said pressure means for applying heat to said slide fastener strip simultaneously with the application of pressure thereto by said pressure means, means for controlling the temperature of said heating means, means for driving said padded roller at a controlled speed, supply and feed means for supplying and feeding coating tape to be juxtaposed with said slide fastener strip and simultaneously fed over said roller with the coating tape in contact with said heating means and said pressure means, and means for guiding said slide fastener tape and said coating tape to cause said coating tape to be applied to said slide fastener tape along a predetermined area of the stringer portion of said slide fastener strip.

4. Slide fastener strip processing apparatus comprising a roller, means for feeding a substantial length of slide fastener strip, means for guiding said strip over said roller, pressure means associated with said roller for subjecting said slide fastener strip to pressure, said pressure means having an indentation adapted to accommodate the scoops of said slide fastener strip to avoid interference with the passage of said strip and a portion adjacent said indentation adapted to contact a substantial width of the stringer portion of said strip for the application of pressure thereto, heating means for applying heat to said slide fastener strip simultaneously with the application of pressure thereto by said pressure means, means for driving said roller at a controlled speed, supply and feed means for supplying and feeding a pair of coating tapes to be juxtaposed with said slide fastener strip and simultaneously fed over said roller with the coating tape in contact with said pressure means, means for guiding said slide fastened strip and said coating tapes to cause said coating tapes to be applied to said slide fastener strip along a predetermined area of the stringer portions of said slide fastener strip, and means for withdrawing the slide fastener strip and coating tape from said padded roller and maintaining a substantially uniform tension thereon.

5. Slide fastener strip processing apparatus comprising a roller, means for feeding and guiding a length of slide fastener strip over said roller, pressure means associated with said roller for subjecting said slide fastener strip to pressure, said pressure means having an indentation adapted to accommodate the scoops of said slide fastener strip to avoid interference with the passage of said strip and a portion adjacent said indentation adapted to contact a substantial width of the stringer portion of said strip for the application of pressure thereto, heating means adapted to heat said slide fastener strip to a temperature substantially above room temperature during the application of pressure thereto by said pressure means, means for driving said roller feed means for feeding coating tape to be juxtaposed with said slide fastener strip and simultaneously fed over said roller therewith and means for guiding said slide fastener strip and said coating tape to cause said coating tape to be applied to said slide fastener strip along a predetermined area of the stringer portion of said slide fastener strip.

6. Slide fastener strip processing apparatus comprising a roller, means for feeding and guiding a length of slide fastener strip over said roller, pressure means associated with said roller and having a portion adapted to contact a substantial width of the stringer portion of said strip for the application of pressure thereto, heating means adapted to heat said slide fastener strip to a temperature substantially above room tempertaure during the application of pressure thereto by said pressure means, means for driving said roller, feed means for feeding coating tape to be juxtaposed with said slide fastener strip and simultaneously fed over said roller with the coating tape in heat exchanging relation with said heating means and means for guiding said slide fastener strip and said coating tape to cause said coating tape to be applied to said slide fastener strip along a predetermined area of the stringer portion of said slide fastener strip.

7. Apparatus for processing strip material having a raised portion and a stringer portion comprising: strip supporting means, means for feeding a length of strip material over said strip supporting means, means for feeding a coating tape to be juxtaposed with said strip material and simultaneously fed along said strip supporting means therewith, means for guiding said strip material and said coating tape so that said coating tape contacts said strip material along a predetermined area of the stringer portion thereof, pressure means cooperating with said strip supporting means and having a portion adapted to press said coating tape against said predetermined area of the stringer portion of said strip material, and heating means for heating said coating tape and said strip material to a temperature substantially above room temperature during the application of pressure thereto by said pressure means.

8. The apparatus of claim 7 wherein said heating means is adapted to heat the portion of said pressure means adapted to press said coating tape against the stringer portion of said strip material so as to simultaneously apply heat and pressure thereto.

9. Apparatus for processing strip material having a raised portion and a stringer portion, comprising: strip supporting means, means for feeding a length of strip material over said strip supporting means, pressure means cooperating with said strip supporting means for subjecting said slide strip material to pressure, said pressure means having an indentation adapted to accommodate the raised portion of said strip material to avoid interference with the passage of said strip material and a portion adjacent said indentation adapted to contact a substantial width of the stringer portion of said strip material for the application of pressure thereto, heating means adapted to heat said strip material to a temperature substanially above room temperature during the application of pressure thereto by said pressure means, feed means for feeding coating tape to be juxtaposed with said strip material and simultaneously fed over said strip supporting means therewith and means for guiding said strip material and said coating tape to cause said coating tape to be applied to said strip material along a predetermined area of the stringer portion thereof.

No references cited.

EARL M. BERGERT, *Primary Examiner.*

M. L. KATZ, *Assistant Examiner.*

UNITED STATES PATENT OFFICE
CERTIFICATE OF CORRECTION

Patent No. 3,410,745                                                November 12, 1968

William P. Canepa

It is certified that error appears in the above identified patent and that said Letters Patent are hereby corrected as shown below:

Column 1, line 62, "notatably" should read -- rotatably --. Column 7, line 16, cancel "slide".

Signed and sealed this 10th day of March 1970.

(SEAL)
Attest:

Edward M. Fletcher, Jr.                              WILLIAM E. SCHUYLER, JR.
Attesting Officer                                              Commissioner of Patents